Sept. 24, 1946. P. C. McLEMORE 2,408,328
APPARATUS FOR CULTIVATION OF PLANTS
Original Filed Oct. 11, 1939 2 Sheets-Sheet 1
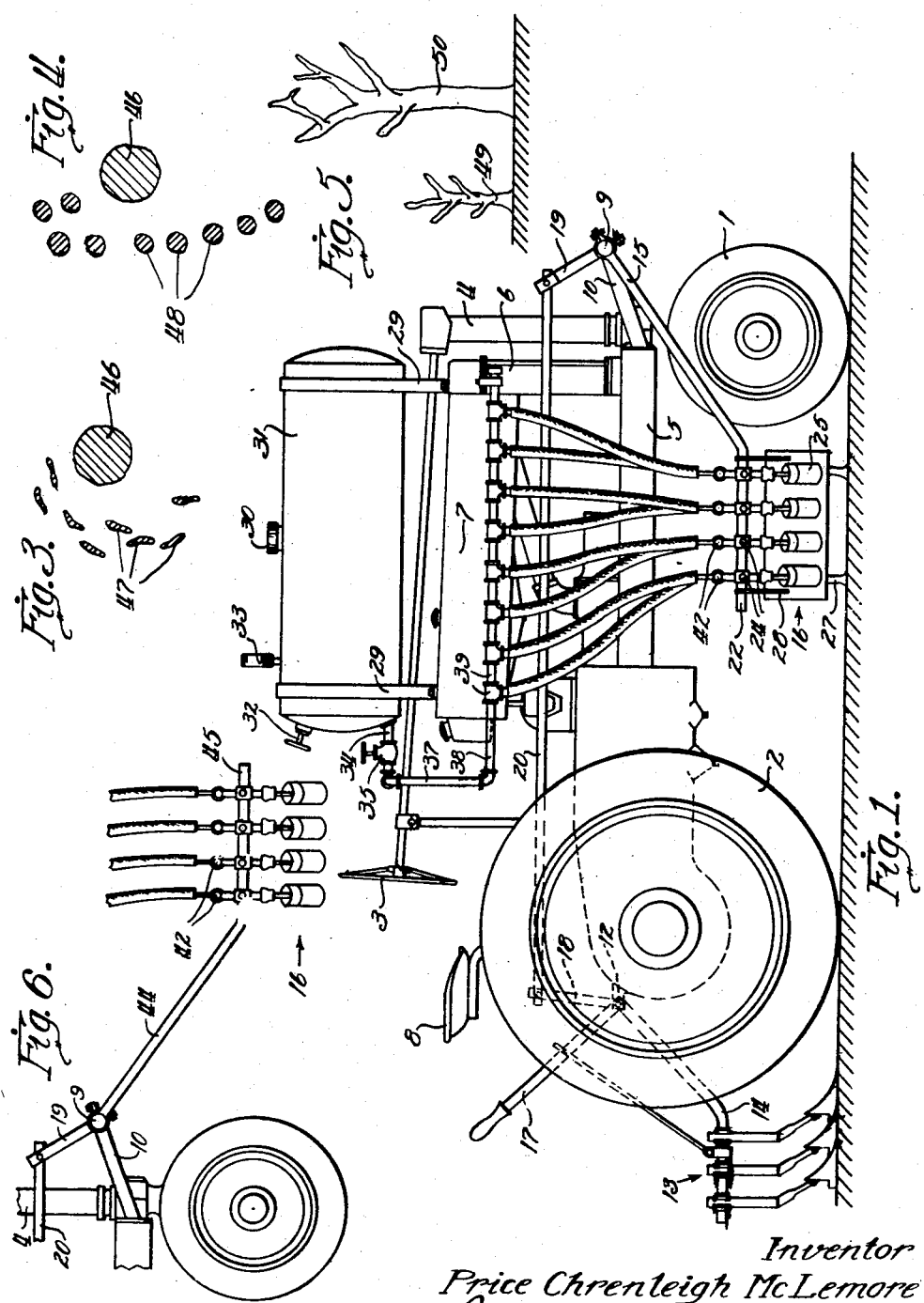
Inventor
Price Chrenleigh McLemore

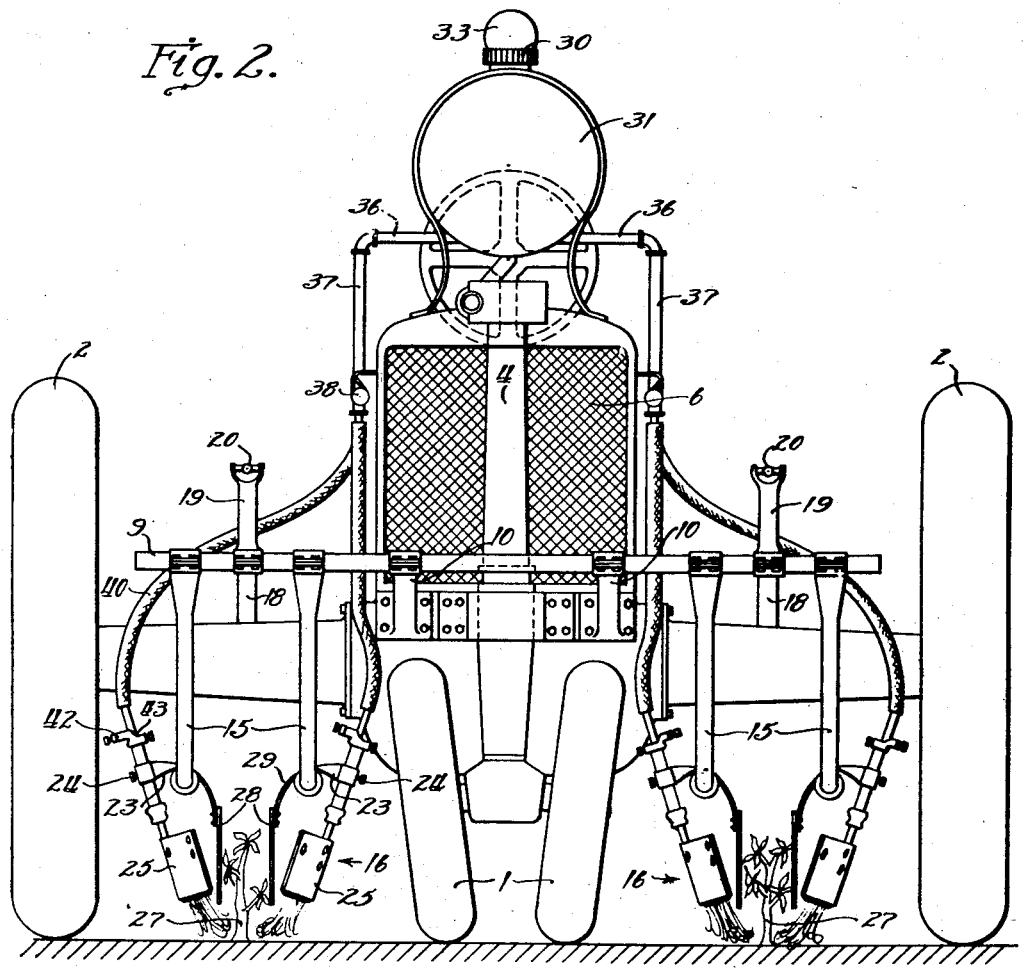

Patented Sept. 24, 1946

2,408,328

UNITED STATES PATENT OFFICE 2,408,328

APPARATUS FOR CULTIVATION OF PLANTS

Price Chrenleigh McLemore, Montgomery, Ala.

Original application October 11, 1939, Serial No. 298,870. Divided and this application November 4, 1940, Serial No. 364,140

11 Claims. (Cl. 126—271.2)

My invention relates to apparatus for cultivation of plants.

The present application is a division of my pending application Serial No. 298,870, filer October 11, 1939, issued as Patent No. 2,327,204, on August 17, 1943

While the specific illustration and detailed description is directed to the cultivation of cotton plants, it is to be understood that this is by way of exemplification and not by way of limitation. The invention is applicable to the cultivation of other crops, such as corn, legumes, potatoes, tomatoes, sugar cane, and even to crops such as beets. My apparatus may be employed with the cultivation of annual plants or perennial plants, and even to such types as bushes and trees, if desired, particularly when it concerns the problem of suppressing weeds or casual or incidental plants as against those intended to constitute the crop or to furnish the crop.

Also, while the apparatus herein disclosed is particularly applicable to the cultivation of row crops, the invention in its broader aspect is not limited to row crops, as will be apparent hereinafter.

The principle upon which the apparatus of my invention proceeds is the discovery that there is a marked difference in the resistivity of plants to this application of heat, particularly heat at high temperature. It is known that frost and cold affect various plants quite differently. I find that there are at least equal differences in their reaction to applied heat, although the differences in reaction are intensified, according to my invention, inasmuch as the heat is applied under control as to place or point of application, as well as in respect to time, volume and intensity. The plant that will endure cold does not necessarily react in the same manner to applied high temperature.

I have found that by the application of heat under suitable control, and as to time, temperature, volume, and point or region of application, certain of the varieties in a stand of vegetation of mixed character may be selectively destroyed. The useful application of the principle involved in my invention resides not so much in the natural resistance to hotter or colder climates of differet kinds of plants or vegetation, but rather in the different effect of, or reaction to suddenly or rapidly applied heat, particularly at high temperatures, that is, applied at a high temperature differential. Such a process is comparable to singeing. The shape of a blade of grass is such that it presents a large area for a given volume, and also, each point in its cross section is at only a minimum distance from the surface. Hence when a flame is applied to both grass blades and to a stemmed plant, the grass may be cooked, scorched and burned before the stemmed plant receives substantial injury. This results chiefly from the shape of the subject treated. Rapidly applied heat, that is, a high temperature gradient, will also selectively act as between a smaller plant and a larger plant of the same species.

This principle of selective reaction to applied high temperature finds its most useful, though by no means only, application to the cultivation of row crops such as cotton, and it has particular value in the case of cotton for reasons some of which will hereinafter appear.

The type of plant which lends itself most readily to this mode of cultivation is that which within a short time, say a few weeks after planting, grows sufficiently and is of such a character that it will produce or develop a stem system that is materially larger in body, both as to diameter and as to height, than the obnoxious vegetation which is to be destroyed or inhibited.

Advantage may be taken in the differential in growth between the stem plant and the grass or other obnoxious vegetation by setting out young plants instead of growing the plants in place from seed. For a crop such as cotton, which if protected from freezing will produce for several years on the same root and stem system, the differential in size may be obtained at an earlier date than would be possible from seed grown plants. Since, however, most row crops are grown in place from seed, the specific description of an embodiment of my invention herein set forth assumes seed planting. Since an initial rapid growth, or an advanced stage of growth are favorable factors, I intend the same to be included within the scope of the present invention. The apparatus of my present invention find particular application on any row crop which, by natural or artificial means, may be made to yield a stem system which is materially larger, and hence more heat resistant, than the accompanying obnoxious vegetation.

The chief object of the present invention is to provide apparatus for the cultivation of crops, particularly such as cotton, at a lower cost than is at present attainable.

It has heretofore been attempted to mechanize certain steps in the production of cotton fiber. The original bottleneck in the production of cotton was in the separation of the seeds from the fiber, which was solved by the cotton gin. The planting of the seeds by machinery is, of course, a simple matter. Harvesting the cotton, as by mechanical cotton pickers, is a demonstrated possibility but for the present is uneconomic for the reason that up to the present time no adequate and universally applicable mechanical device for destroying or inhibiting the growth of obnoxious vegetation, such as grass and weeds, has been developed. Hence hand cultivation has been unavoidable. With the requirement for human labor in cultivating the cotton there is little economic advantage in the use of a mechanical cotton picker when the labor available for that step must be maintained on account of the necessity for manual cultivation of the cotton in the earlier stages.

Another object of the present invention is to provide apparatus for cultivating cotton by machinery so that hand cultivation may be dispensed with and the entire operation of raising and harvesting cotton may be mechanized.

A further object of the invention is to improve the crop in quality and yield. By the use of the present apparatus, less disturbance of the root system of the cotton plant is occasioned, and the crop proceeds more rapidly. Also, less waste of fertilizer is entailed by the use of the present apparatus, and I have found that crops such as cotton which normally require considerable quantities of chemical fertilizers to insure normal yield and quality, may be cultivated with a material reduction in the quantity of fertilizer required. This reduction in quantity of fertilizer is accomplished by the more effective removal of the obnoxious vegetation than heretofore was possible. The reduction in the amount of fertilizer used may also in part be due to transformations, either chemical or physical, in the fertilizer due to the heat employed, with the result that the active constituents are rendered better available to the plants throughout their growing period, instead of being lost by solution in rain or other irrigation waters.

In the preferred form of apparatus of my invention heat is generated in the form of a blast of flame which is caused to impinge upon the ground alongside of the plants in the row in such a manner as to destroy the obnoxious vegetation without at the same time doing any substantial injury to the row crop plants.

Now in order to acquaint those skilled in the art with the construction and operation of specific embodiments of my invention I shall describe, in conjunction with the accompanying drawings, apparatus embodying specific examples of my invention.

In the drawings:

Figure 1 is a side elevational view, more or less diagrammatic, of a tractor provided with burners and fuel supply means in accordance with my invention;

Figure 2 is a front elevational view of the same, showing the method of treating the obnoxious vegetation and the crop plants;

Figure 3 is a diagram illustrating how differences in form affect the selective ability to withstand applied high temperatures;

Figure 4 is a similar diagram, showing how variations in size of cross section affect the resistivity to high temperatures;

Figure 5 illustrates how the same plant at different stages of growth has different resistivity to applied high temperatures; and Figure 6 is a fragmentary illustration of a modification of the apparatus shown in Figures 1 and 2 where the burners are carried in advance of the tractor.

As a specific example and embodiment of my invention, the cultivation of cotton in conjunction with the apparatus of my present invention will now be described.

The field to be planted is plowed, bedded and planted as usual, with the exception that, preferably, care is taken to produce as flat a seed bed as possible. In general, planting should follow immediately after bedding in order to insure a clean seed bed. As soon as the cotton reaches a good and full stand it is first plowed and the dirt thrown back towards the cotton. During the next several weeks the cotton should be plowed as often as may be necessary to prevent the growth of obnoxious vegetation, preferably at least once a week. While not essential, materially improved results are obtained if as much dirt as possible, without covering the plant, is thrown around the cotton by each plowing operation. Cultivation is continued in this manner until the cotton plant has four leaves, or, in other words, about four weeks old. At about this stage of growth the plants may be chopped into a stand of hills each containing four to six stalks. Chopping may be done in a number of ways, as, for example, by plowing across the rows in such a manner as to cover or turn under all cotton except the desired hills, which preferably should be spaced about two feet on centers. Chopping may also be done, if desired, by hand labor, whereby the unwanted plants are removed by hoeing or by any mechanical contrivance which will, in effect, remove the unwanted plants. After chopping the cotton should, in general, be swept at once. For the next two or three weeks sweeping is continued as often as may be necessary to keep all young grass covered, preferably at least once a week.

When about six weeks old the cotton will have grown to a fairly substantial size, each stalk being, say about ⅛" in diameter and from 4" to 6" tall. By this time the obnoxious vegetation will have become very difficult to control by sweeping alone. The apparatus of my invention may now be employed to effect the destruction of the obnoxious vegetation. As previously noted, the apparatus preferably comprises burners for applying the heat in the form of a flame. The burners or other means for projecting heat are preferably mounted upon a vehicle which is adapted to be moved along at a substantially constant velocity so that the time of application of the flame multiplied by the temperature thereof will be effective to destroy the obnoxious vegetation, but will not injure the crop. Preferably, the burners or the like are mounted upon an ordinary farm tractor which has an automatic speed governor as is well known in the art, so that the tractor may be propelled at a predetermined constant velocity. Obviously, the burners or the like could be mounted upon a vehicle which is drawn by the tractor, or if desired constant speed could be attained with animals as the motive force.

The apparatus is preferably designed so that the flame may be directed to effect destruction of the obnoxious vegetation of approximately two to four inches on both sides of the row. With this type of apparatus the obnoxious vegetation in the center of the row may be controlled by plowing.

Although it is not essential, I prefer that the cotton be swept after each burning. Burning may be repeated as often as is necessary to suppress the obnoxious vegetation, preferably once a week for the next four to six weeks or until mature plants are obtained.

As the plants grow older, more intense heat for longer intervals of time may be applied to effect the destruction of the obnoxious vegetation, without injury to the cotton plants themselves. In the latter stages of growth, obnoxious vegetation of practically any size may be removed by flaming. With the young cotton, however, care must be exercised to prevent injury to the cotton plant. For this reason it is preferable that the cotton be swept during the interval prior to the first burning often enough to prevent the growth of obnoxious vegetation until the plants are large enough to withstand flaming, as previously noted. The first several burnings should preferably, therefore, be frequent enough so as to insure that no obnoxious vegetation reaches an advanced stage of growth. Tests have shown that grasses and other forms of obnoxious vegetation are burned almost instantly by the torch flame if the flame is applied as soon as the obnoxious vegetation breaks through the ground.

As previously noted, the burning is continued at intervals until a mature and fruiting plant is obtained. The burning may then be discontinued and the cotton left until the bolls open. The cotton may then be picked, either by hand labor or by a mechanical device, as desired.

Referring now to Figures 1 and 2, I have shown a tractor of known construction, comprising dirigible wheels 1 at the front and driving wheels 2 at the rear. The front wheels 1 are steered by a suitable steering mechanism including the steering wheel 3, operating mechanism in the front post 4 to steer the tractor as desired. The front and rear wheels are connected by a suitable chassis frame 5, and upon this frame and partly in it is mounted a power plant including an internal combustion engine having suitable fuel supply means, an exhaust pipe, and suitable controls for governing the starting, stopping, and speed of the engine. The tractor is provided with an automatic speed governor for maintaining a fixed speed as is well known in the art. A cooling system, including the radiator 6, is mounted at the front end of the chassis frame and a suitable hood 7, which forms a protection for the engine and houses fuel and water tanks for the engine, extends rearwardly from the top of the radiator 6. The tractor is provided with a suitable seat 8 for the operator, and in convenient position from the seat are the usual controls for governing the operation of the tractor. The rear wheels 2 are spaced to go outside of two rows and the front wheels 1 are located so as to travel between the same two rows, as is clear from Figure 2. This type of tractor, commonly employed for agricultural purposes, is equipped with a cross-bar 9 at the front. The cross bar 9 is secured to the frame of the tractor as by means of brackets 10—10. This type of tractor is frequently supplied with sweeps either extending in front of the cross bar 9 or to the rear of the same. Likewise, at the rear of the tractor a similar cross bar 12 mounts the rear sweeps 13 upon a suitable mounting arm 14. A similar arm 15 connected to the cross bar 9 at the front may normally support sweeps such as those at 13 but, in the present construction, there is held mounted upon the lower part of the arm 15 a bank of oil burners 16. By means of a lever 17 or like equipment, and through the connecting arms 18, 19 and connecting rod 20, the sweeps 13 and the burners 16 may be raised and lowered. Suitable bracing means (not shown) may be employed for supporting the sweeps and burners. Power mechanism may be employed, if desired, to raise and lower these parts.

The arm 15 has a horizontal extension 22 at the rear end and upon this horizontal portion are mounted, by means or brackets 23, 23 the individual burners 25, 25. The burners are adjustable as to height in the brackets 23 as by means of the set screw adjustment 24. In each of the banks of burners here shown I have indicated four individual burners 25, but obviously the number may be larger or smaller, as desired. The burners 25, 25 may generate a free flame of from 2″ to 2½″ in diameter by 12″ to 16″ long, and they are spaced from the surface of the ground a distance of approximately 6″, in the specific instance here illustrated, so that the flames from these burners bathe the ground and the stems of the cotton plants 27. Preferably, although not necessarily, heat barriers in the form of asbestos or transite plates 28 are carried on brackets 29 from the arm extensions 22, 22 so as to interpose their insulating effect between the burners and the foliage and tops of the cotton plants or other crop plants in the row. These shields are not strictly necessary, but they permit the burners to be brought more closely together adjacent the foot or stem of the plant without doing any unnecessary injury to the foliage and tops. Since the bodies of the burners 25, 25, particularly in the blow torch type of burner, grow quite hot these shields, in addition to limiting the projection of flame, limit or guard the plants against contact with the hot burner parts.

A supply tank 31 is carried on brackets 29, 29 upon the vehicle. In this case the brackets are mounted upon the top of the tractor hood 7, although any other suitable, preferably elevated, position may be employed. The location of the tank 31 is not of importance except that where gravity feed is desired the tank should be suitably elevated. The tank may be carried upon another vehicle or at some other location on the same vehicle, if desired. The tank 31 is provided with a filler cap 30, which is preferably capable of effecting an air seal, and the tank in the present instance is adapted to be put under air pressure by means of a hand air pump 32, a gauge 33 being provided to indicate the pressure in the tank. For burners of the blow torch type here illustrated, this pressure may be of the order of from 10 to 50 lbs. per square inch.

As shown in Figure 2, four banks of burners 16, for servicing two rows of plants simultaneously, are provided. From the tank 31 a supply line 34, provided with a suitable shut-off valve 35, extends to a cross pipe 36, each end of which is extended downwardly as at 37 to connect with a manifold 38 at each side of the tractor. The manifold 38 is provided with T connections 39, 39 leading off through suitable flexible connections 40, 40 to the individual burners 25. The flexible connections may be of a rubber-like material immune to the action of oil, such as neoprene or Thiokol, or alternatively it may be a flexible metal tubing, or flexible metal hose, or armored hose, or any other suitable flexible pressure and oil-resisting connection. Each flexible hose 40 connects to its individual burner 25 through a regulating valve 42. A removable screen is mounted at 43 in the line between the fuel supply tank and the burner tip so as to screen or strain out any scale or other solid impurities which might plug up the burner orifices.

I have shown the vaporizing type of burner, such as the common blow torch embodies. The burners are initially heated up and upon becoming heated they serve to vaporize the fuel which is fed to them under pressure and project a hot, colorless and smokeless flame, as is well known to those skilled in the art. The bank of burners 16, instead of being carried rearwardly on the arm 15 may be carried on an arm 44 projecting forwardly of the cross bar 9, as shown in Figure 6, the bank of burners, in that case, being mounted upon a horizontal portion 45 of the arm 44 so as to be carried in front of the vehicle instead of behind the front wheels 1.

The particular form of burner is optional within my invention. That is to say, while I have shown the vaporizing type of burner (and this is the preferred type), I intend to include within the invention any alternative form of burner or heat projecting means for accomplishing the same purpose in substantially the same mannner. For example, an atomizing type of burner depending upon the delivery of oil through an orifice at very high pressure may be utilized. In that case, a suitable power pump and storage tank may be employed. The pump in that case may be driven from the tractor engine or any other suitable source of power, and one or more or all of the burners may be supplied with pressure from the same source.

An air atomizing or steam atomizing burner of the cannon type may also be employed, if desired. In that event, means for generating a suitable atomizing fluid pressure, as, for example, an air compressor and tank, or a steam boiler, for generating the atomizing pressure, may be carried by the tractor or on a vehicle operating in conjunction therewith.

The vaporizing or blow torch type of burner is generally preferable for the reason that an unconfined flame generated by this form of burner is shorter, that is, burns in shorter length and in less space than an atomizing type of burner, although I do not mean by this to exclude others by the above indicated preference.

The operation of the device shown in Figures 1 and 2 is as follows: The operator of the tractor having put the burner banks 16 into operation, drives the tractor along the two rows as indicated in Figure 2 at a speed which is adjusted to the flame and to the selective action upon the crop plants and obnoxious vegetation as determined by the size of the plants 27, the density of the obnoxious vegetation, and similar factors. Usually the tractor is driven at a rate of about four miles per hour, at a substantially uniform speed throughout the length of the row. When the flame is developed in good volume and directed upon the ground at the base of the crop plants 27, it cooks, sears and singes the grass and other obnoxious vegetation without doing substantial injury to the crop plants, such as the cotton plants 27 illustrated in Figure 2. One reason why a stemmed plant is less subject to injury than grass or other obnoxious vegetation of that type is illustrated in Figure 3.

In Figure 3 I have shown a cross section, and diagrammatically, the stem 46 of a stemmed plant. This is, of course, on an enlarged scale. At 47 I have shown in cross section, and diagrammatically, leaves of grass constituting the obnoxious vegetation. Now it will at once be seen that the ratio of area to volume of the blades of grass as compared with the stem of the cotton plant is immensely greater. Likewise, the distance of any living cell in the grass blade from the surface is very much less than the distance of a cell in the central part of the stem 46 from the surface. So that, even if the stem 46 should be singed upon the surface, the living cells in the central part of the stem would receive no injury, whereas the entire blade of grass would be destroyed.

Even in the case of stemmed vegetation of smaller diameter than that of the crop plant 46 as shown in Figure 4, it will at once be appreciated that the smaller stems 48, 48 would be destroyed before the stem 46 would receive substantial injury if the two were subjected to a high temperature flame for a short period of time.

The principle of selectively causing injury by the application of heat is applicable to plants of the same kind of different size, as may be seen in Figure 5. Assume that the older plant 50 and the younger plant 49 are subjected to the same projected heat, it will be obvious that the younger plant 49 will perish before the older plant 50 is seriously affected. Quite obviously, as between vegetation of a lighter structure, such as blades of grass, and that of a heavier structure, such as stemmed plants, there is a wide margin which my invention may be employed to take advantage of.

I prefer a higher temperature differential, such as is secured either by a flame, since the heat transfer not only is more rapid but is instantly discontinued as the nozzle or burner passes.

While I have indicated certain ways in which my invention may be embodied and practiced, it is to be understood that the above specific illustrations are but exemplifications of the basic concept, and that I do not intend to be limited by the specific illustrations except as the following claims are specifically directed to the same.

In the more or less schematic showing of Figures 1 and 2, four burners on each side of each row are shown. Obviously the number of burners may vary with local conditions and different crops. However, the burners shown, when attached to a tractor running four miles per hour and generating flames from 2" to 2½" in diameter by 12" to 16" long if directed into free space, are on the average satisfactory for the cultivation of cotton as previously outlined. For other row crops, or other local or unusual conditions, either fewer or more burners may be used as required, and it is to be understood that the size of plants determines to a large extent the intensity and amount of heat which they will withstand without injury, and the operator is expected to vary the procedure accordingly.

One great advantage of the present system of cultivation is that it is substantially independent of the soil conditions. That is to say, even though the ground might be too wet for cultivation by plowing or sweeping, the apparatus of my invention may be employed if the ground is firm enough to support the tractor, or any other conveyance suitable for the application of heat in accordance with my invention.

The sweeps shown in Figure 1 at the rear of the tractor are preferably employed immediately after flaming, but it is to be understood that this is optional and they may be dispensed with.

The operation of flaming, according to my invention, appears to have a greater retarding effect upon the growth of noxious plants than the mere cutting off of as much as is destroyed by the flaming. In other words, flaming appears to give a greater setback to plant growth than does equivalent injury by mechanical means.

I claim:

1. A flame cultivator comprising a vehicle having ground engaging wheels for supporting the vehicle on the ground, a pair of burners connected to the vehicle for travel therewith, and fuel supply means carried by said vehicle for supplying said burners, said burners being disposed upon opposite sides of a vertical plane which extends longitudinally of the vehicle and parallel to the line of forward travel of the vehicle, each burner being directed diagonally downwardly in a direction substantially crosswise of said vehicle for causing its flame to strike the surface of the ground supporting the vehicle at a point short of the line of intersection of the said plane and the ground, said burners and fuel supply means cooperating to cause each burner to project a relatively long otherwise unconfined flame which is spread by impingement against the ground to form a laterally widened sheet of flame of shallow depth which flows along the ground and floods across the line of intersection of the said plane and the ground.

2. The cultivator of claim 1 wherein the vehicle is self-propelled and has a speed control governor whereby the time of application of the flame to an object exposed to the flame is definitely determined.

3. A row crop cultivator for bathing the bases of the crop plants and the weeds in and along the sides of a row with flame, comprising the combination with a vehicle having ground engaging wheels for supporting the vehicle and adapted to travel along the row to be treated, of a burner system carried by said vehicle comprising a liquid fuel tank, and a pair of high pressure liquid fuel burners fed therefrom and mounted on said vehicle upon opposite sides of an intermediate vertical plane which extends longitudinally of the vehicle in the direction of its intended line of travel, and which plane is adapted to coincide substantially with the crop row in the use of said vehicle, each of said burners being directed diagonally down toward the surface of the supporting ground short of the line of intersection of the plane and the ground, and having means for projecting a relatively long unconfined blast of high intensity flame against and along the surface of the ground in a direction substantially transverse to the line of travel, said burner system and burners being of the high pressure type operating at pressures up to approximately 50 lbs. per square inch for causing each of said burners to project a voluminous blast of free flame of approximately 12 to 16 inches in length, and the discharge ends of said burners adapted to be spaced from the ground a distance of approximately 6 inches so that the flames from said burners bathe the ground along and on each side of said line of intersection in a voluminous high intensity flame.

4. In a flame cultivator adapted to cultivate row crops by the flame method, the combination of a vehicle having ground engaging wheels for supporting the vehicle, vertically swinging mounting means pivotally connected to said vehicle on a substantially horizontal transverse pivot axis and extending rearwardly from said pivot axis whereby the rear portion of said mounting means can swing substantially vertically, a pair of burners carried by said mounting means upon opposite sides of an intermediate vertical plane which extends longitudinally of the vehicle and which intermediate vertical plane is adapted to coincide substantially with the crop row in the operation of the vehicle, each of said burners being directed diagonally down toward the surface of the supporting ground short of the line of intersection of the plane and the ground, said burners comprising means for projecting a volume of flame which spreads along the ground and floods across the intersection of the plane and the ground for impinging directly against the weeds and the plants in the plant row, lifting mechanism operative to swing said mounting means substantially vertically around said transverse pivot axis to raise and lower said burners, a fuel tank on said vehicle, and supply connections for conducting the fuel from said tank to said burners, said supply connections comprising sections of flexible hose to accommodate the aforesaid vertical movement of said burners.

5. A row crop cultivator for bathing the bases of the crop plants and weeds in a row with flame, comprising the combination with a vehicle having ground engaging wheels for supporting the vehicle, said vehicle being adapted to travel along the crop row to be treated, of a blast burner connected to the vehicle for travel therewith, fuel supply means carried by said vehicle for supplying said burner, said burner being disposed to one side of a vertical plane which extends longitudinally of the vehicle and parallel to the line of forward travel of the vehicle, said burner being directed diagonally downwardly in a direction substantially at right angles to said vertical longitudinal plane for causing its flame to strike the ground at a point short of the line of intersection of the said plane and the ground and in a direction substantially at right angles to said plane, and a shield connected to said vehicle and adapted to travel between the burner and the crop row in the operation of the vehicle, said shield having its lower edge spaced from the ground, said burner being of a high capacity blast type projecting a relatively long unconfined flame which passes under the lower edge of said shield and floods into and through the plant row, whereby as the vehicle moves along the row the bases of the crop plants and the weeds in said row are bathed in flame.

6. In a flame cultivator adapted to cultivate row crops by the flame method, the combination of a vehicle having ground engaging wheels for supporting the vehicle, a pair of burners connected to said vehicle for travel therewith, and fuel supply means carried by said vehicle for supplying said burners, said burners being disposed upon opposite sides of a vertical plane which extends longitudinally of the vehicle and parallel to the line of forward travel of the vehicle, each burner being directed diagonally downwardly in a direction substantially crosswise of said vehicle and toward said plane for causing its flame to strike the surface of the ground at a point short of the line of intersection of the said plane and the ground, whereby the ground serves as a deflecting means for causing each flame to spread out and to flood across the line of intersection of the said plane and the ground in the form of a thin sheet of flame flowing along the ground, so that the impingement of the flames against the plants in the crop rows is confined substantially entirely to the base portions of the plants and destructive injury to the upper portions of the plants is avoided.

7. A row crop cultivator for bathing the bases of the crop plants and the weeds in and along the sides of a row with flame, comprising the combination, of mounting means for mounting on a vehicle, said vehicle having ground engaging wheels for supporting the same and which is adapted to travel along the row to be treated, a burner system carried by said mounting means comprising a liquid fuel tank, and a pair of high pressure liquid fuel burners fed therefrom and mounted on said mounting means upon opposite sides of an intermediate vertical plane which extends with respect to said mounting means in the direction of its intended line of travel, and which plane is adapted to coincide substantially with the crop row in the use of said mounting means, each of said burners being directed diagonally down toward the surface of the ground short of the line of intersection of the plane and the ground, and having means for projecting a relatively long unconfined blast of high intensity flame against and along the surface of the ground in a direction substantially transverse to the line of travel, said burner system and burners being of the high pressure type operating at pressures up to approximately 50 lbs. per square inch for causing each of said burners to project a voluminous blast of free flame of approximately 12 to 16 inches in length, and the discharge ends of said burners adapted to be spaced from the ground a distance of approximately 6 inches so that the flames from said burners bathe the ground along and on each side of said line of intersection in a voluminous high intensity flame.

8. In a flame cultivator adapted to cultivate row crops by the flame method, the combination, of support means for mounting on a vehicle, said vehicle having ground engaging wheels for supporting the vehicle, vertically swinging mounting means pivotally connected to said support means on a substantially horizontal transverse pivot axis and extending rearwardly from said pivot axis whereby the rear portion of said mounting means can swing substantially vertically, a pair of burners carried by said mounting means upon opposite sides of an intermediate vertical plane which extends transversely of said pivot axis and which intermediate vertical plane is adapted to coincide substantially with the crop row in the intended movement of said support means, each of said burners being directed diagonally down toward the surface of the ground short of the line of intersection of the plane and the ground, said burners comprising means for projecting a volume of flame which spreads along the ground and floods across the intersection of the plane and the ground for impinging directly against the weeds and the plants in the plant row, lifting mechanism operative to swing said mounting means substantially vertically around said transverse pivot axis to rise and lower said burners, a fuel tank adapted to be mounted on said support means, and supply connections for conducting the fuel from said tank to said burners, said supply connections comprising sections of flexible hose to accommodate the aforesaid vertical movement of said burners.

9. A flame cultivator comprising the combination, of mounting means for mounting on a vehicle, said vehicle having ground engaging wheels for supporting the vehicle on the ground, a pair of burners connected to said mounting means for travel therewith, and fuel supply means carried by said mounting means for supplying said burners, said burners being disposed upon opposite sides of a vertical plane which extends with respect to said mounting means parallel to the intended line of forward travel thereof, each burner being directed diagonally downwardly in a direction substantially crosswise of said vertical plane for causing its flame to strike the surface of the ground at a point short of the line of intersection of the said plane and the ground, said burners and fuel supply means cooperating to cause each burner to project a relatively long otherwise unconfined flame which is spread by impingement against the ground to form a laterally widened sheet of flame of shallow depth which flows along the ground and floods across the line of intersection of the said plane and the ground.

10. A row crop cultivator for bathing the bases of the crop plants and weeds in a row with flame, comprising the combination, of mounting means for mounting on a vehicle, said vehicle having ground engaging wheels for supporting the vehicle, said vehicle being adapted to travel along the crop row to be treated, a blast burner connected to said mounting means for travel therewith, fuel supply means carried by said mounting means for supplying said burner, said burner being disposed to one side of a vertical plane which extends with respect to said mounting means parallel to the intended line of forward travel thereof, said burner being directed diagonally downwardly in a direction substantially at right angles to said vertical longitudinal plane for causing its flame to strike the ground at a point short of the line of intersection of the said plane and the ground and in a direction substantially at right angles to said plane, and a shield connected to said mounting means and adapted to travel between the burner and the crop row in the operation of the vehicle, said shield being adapted to have its lower edge spaced from the ground, said burner being of a high capacity blast type projecting a relatively long unconfined flame which passes under the lower edge of said shield and floods into and through the plant row, whereby as the burner is moved along the row the bases of the crop plants and the weeds in said row are bathed in flame.

11. In a flame cultivator adapted to cultivate row crops by the flame method, the combination, of mounting means for mounting on a vehicle, said vehicle having ground engaging wheels for supporting the vehicle, a pair of burners connected to said mounting means for travel therewith, and fuel supply means carried by said mounting means for supplying said burners, said burners being disposed upon opposite sides of a vertical plane which extends with respect to said mounting means parallel to the intended line of forward travel thereof, each burner being directed diagonally downwardly in a direction substantially crosswise of said vertical plane and toward said plane for causing its flame to strike the surface of the ground at a point short of the line of intersection of the said plane and the ground, whereby the ground serves as a deflecting means for causing each flame to spread out and to flood across the line of intersection of the said plane and the ground in the form of a thin sheet of flame flowing along the ground, so that the impingement of the flames against the plants in the crop rows is confined substantially entirely to the base portions of the plants and destructive injury to the upper portions of the plants is avoided.

PRICE CHRENLEIGH McLEMORE.